(12) United States Patent
Chand et al.

(10) Patent No.: US 9,135,646 B2
(45) Date of Patent: Sep. 15, 2015

(54) ASSOCIATING ADVERTISING CONTENT WITH A CHANNEL

(71) Applicants: Ashootosh Chand, Bangalore (IN); Bharathi Shekar, Bangalore (IN)

(72) Inventors: Ashootosh Chand, Bangalore (IN); Bharathi Shekar, Bangalore (IN)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/049,648

(22) Filed: Oct. 9, 2013

(65) Prior Publication Data

US 2015/0100427 A1 Apr. 9, 2015

(51) Int. Cl.
*G06Q 30/00* (2012.01)
*G06Q 30/02* (2012.01)
*G06F 17/30* (2006.01)

(52) U.S. Cl.
CPC ...... *G06Q 30/0267* (2013.01); *G06F 17/30265* (2013.01)

(58) Field of Classification Search
CPC .................................................. G06Q 30/0267
USPC ....................................................... 705/14.64
See application file for complete search history.

(56) References Cited

U.S. PATENT DOCUMENTS

| 2002/0087413 A1* | 7/2002 | Mahaffy et al. ................. 705/16 |
| 2007/0071323 A1* | 3/2007 | Kontsevich et al. .......... 382/190 |
| 2009/0141940 A1* | 6/2009 | Zhao et al. ..................... 382/103 |
| 2010/0111370 A1* | 5/2010 | Black et al. .................... 382/111 |

OTHER PUBLICATIONS

Shazam, "Why should your phone have all the fun?," dated 2002, 4 pages, http://www.shazam.com.
SoundHound, Inc., "SoundHound," May 1, 2013, 2 pages, http://www.soundhound.com.
Disney, "Disney Second Screen," May 1, 2013, from http://www.disneysecondscreen.com, 1 page.

* cited by examiner

*Primary Examiner* — John G Weiss
*Assistant Examiner* — Scott C Anderson
(74) *Attorney, Agent, or Firm* — Patent Law Works LLP

(57) ABSTRACT

The disclosure includes a system and method for identifying advertising content and providing a user of a mobile device with a channel related to the advertising content. A recognition application receives advertising content comprising a series of frames, identifies images corresponding to the frames within the advertising content, identifies a first set of feature points from a first image of the advertising content, determines whether the first set of feature points matches a second set of feature points stored in a database, and in response to determining that the first set of feature points fails to match the second set of feature points, identifies the first image as being unique, indexes the first image and the first set of feature points and associates the first image with a channel.

20 Claims, 6 Drawing Sheets

ASSOCIATING ADVERTISING CONTENT WITH A CHANNEL

BACKGROUND OF THE INVENTION

1. Field of the Invention

The specification relates to a recognition procedure for identifying images irrespective of the medium. In particular, the specification relates to a system and method for identifying advertising content and providing a user of a mobile device with a channel related to the advertising content.

2. Description of the Background Art

Almost all television advertisements inform consumers about different ways to obtain the good or service being advertised. For example, the advertisements provide a uniform resource locator (URL) for a website, a customer service number or a location of a brick and mortar store. The consumer is expected to remember the company information even though once the television advertisement is complete, the information is gone. As a result, advertisements fail to be as effective as they could be because consumers will quickly forget about the advertisement without the additional information.

SUMMARY OF THE INVENTION

The disclosure includes a system and method for identifying advertising content and providing a user of a mobile device with a channel related to the advertising content. In one embodiment, the system is configured to receive advertising content comprising a series of frames, identify images corresponding to the frames within the advertising content, identify a first set of feature points from a first image of the advertising content, determine whether the first set of feature points matches a second set of feature points stored in a database, and in response to determining that the first set of feature points fails to match the second set of feature points, identify the first image as being unique, index the first image and the first set of feature points and associate the first image with a channel.

In some embodiments, a second image can be received from a mobile device. A third set of feature points can be identified from the second image. It is determined that the third set of feature points matches the first set of feature points. The mobile device can be provided with the channel. The channel includes information about an advertiser associated with the advertising content. The advertising content includes an advertisement between video content or within video content. In some embodiments, a different image of the advertising content can be associated with a different channel. User input regarding the channel can be received and an action can be performed responsive to receiving the user input.

Other aspects include corresponding methods, systems, apparatuses and computer program products for these and other innovative aspects.

The specification advantageously describes technology for associating advertising content with a channel and providing the channel to a user. It enables a consumer to connect to a brand through the channel at the time of watching the advertisement, and therefore provides flexibility for both the consumer and the advertiser.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
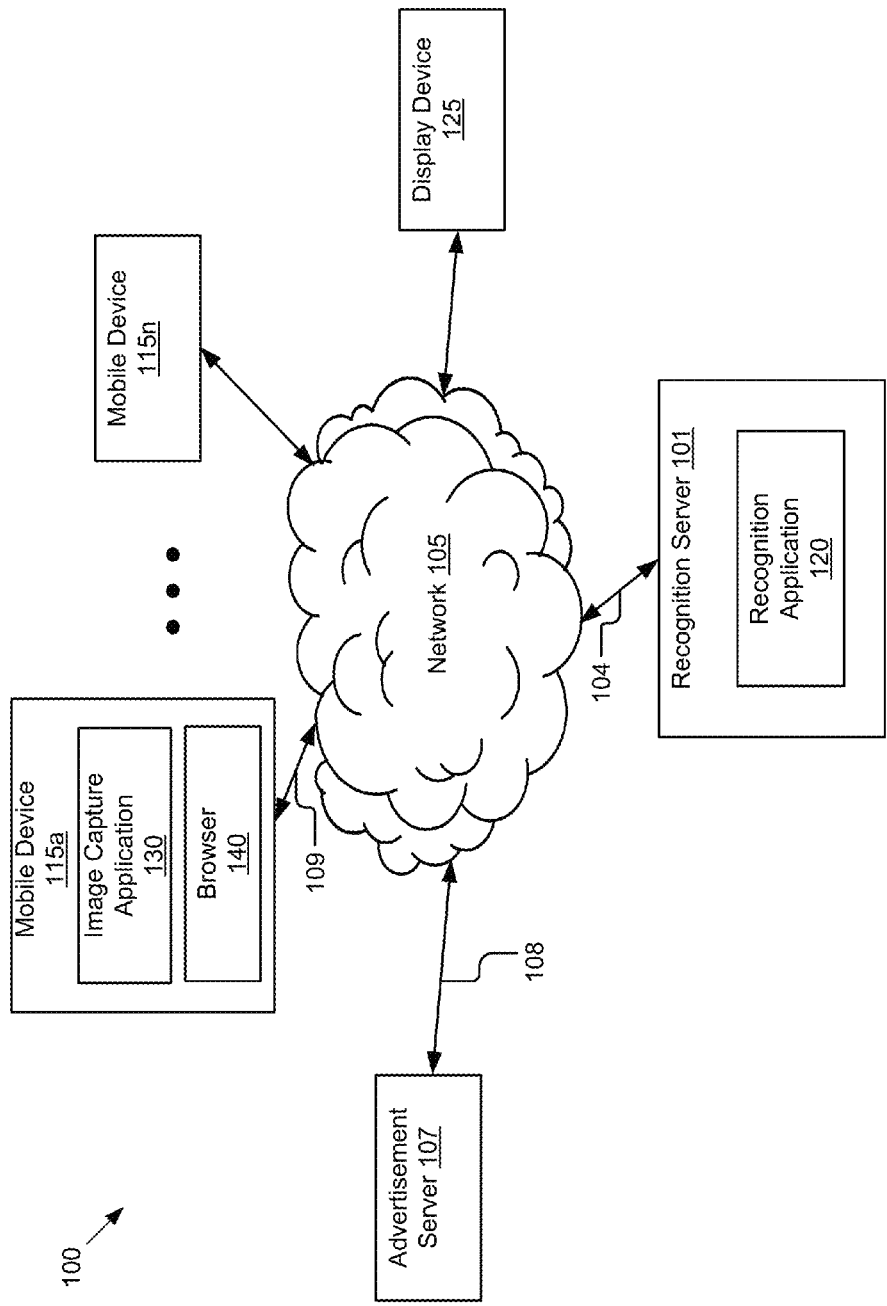
FIG. 1 is a high-level block diagram illustrating one embodiment of a system for identifying advertising content and providing a channel related to the advertising content.

A system and method for identifying advertising content and providing a user of a mobile device with a channel related to the advertising content. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to mobile devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for identifying advertising content and providing a user of a mobile device with a channel related to the advertising content. The illustrated system 100 includes a recognition server 101, an advertisement server 107, a display device 125 and mobile devices 115a . . . 115n that can be accessed by users and the recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the mobile device 115 and the recognition server 101, in practice one or more networks 105 can be connected to these entities.

The advertisement server 107 includes a processor and a memory, and is coupled to the network 105 via signal line 108. The advertisement server 107 provides the recognition server 101 with advertising content. The advertising content is an advertisement comprising a series of frames. For example, the advertising content is a television advertisement that typically contains 25 frames of images or still pictures per second. In one embodiment, the advertising content can be an advertisement that is displayed between video content. The video content includes all content relating to video display and is provided by the advertisement server 107 and a video server (not shown). For example, the advertising content is an advertisement that plays during a commercial break of a program that plays on television. In another embodiment, the advertising content can be an advertisement that is part of video content. For example, the advertising content is a product placement in a TV show. In some embodiments, the advertisement server 107 also provides the recognition server 101 with a channel to be associated with the advertising content.

The recognition server 101 can be a computing device that includes a processor, a memory and network communication capabilities. The recognition server 101 is coupled to the network 105 via signal line 104. In some embodiments, the recognition server 101 sends and receives data to and from other entities of the system 100 via the network 105. For example, the recognition server 101 receives and sends data related to the advertising content to and from the mobile device 115. While FIG. 1 includes one recognition server 101, the system 100 may include one or more recognition servers 101.

The recognition server 101 comprises a recognition application 120. In one embodiment, the recognition application 120 receives advertising content from the advertisement server 107, identifies and indexes the advertising content, associates the indexed advertising content with one or more channels and provides a mobile device with the one or more channels in response to receiving a captured image that matches the advertising content. A channel includes information about the advertiser. In another embodiment, the recognition application 120 also receives an image captured from advertising content using the mobile device 115 and provides a channel related to the advertising content to the mobile device 115. In one embodiment, the recognition application 120 can be implemented using hardware including a field-programmable gate array (FPGA) or an application-specific integrated circuit (ASIC). In another embodiment, the recognition application 120 can be implemented using a combination of hardware and software.

In one embodiment, the recognition application 120 receives advertising content from the advertisement server 107 and identifies the frames within the advertising content and images corresponding to the frames. The recognition application 120 performs feature recognition on the images. The recognition application 120 identifies a first set of feature points from an image The recognition application 120 determines whether the first set of feature points matches a second set of features stored in a database.

If the first and second sets of feature points do not match, the recognition application 120 identifies the image as being unique and indexes the image and the first set of feature points. The recognition application 120 associates the image with a channel. The channel includes information about the advertiser, for example, a telephone number for the company being advertised, a website associated with the company, an order form for ordering a product associated with the company, a coupon for a good or service associated with the company, etc.

If the first and second sets of feature points match, the recognition application 120 determines whether there is another image available for processing. If there is another image available for processing, the recognition application 120 advances to a next image of the advertising content and identifies a next set of feature points. In some embodiments, the recognition application 120 associates the next image with a different channel. For example, the recognition application 120 associates an image from the beginning of the advertising content with a link to a website and associates an image from the end of the advertisement with a coupon for purchasing the good or service being advertised.

The recognition application 120 receives an image from the mobile device 115, identifies a first set of feature points from the image, determines that the first set of feature points matches a second set of feature points stored in a database, identifies a channel associated with the second set of features and provides the mobile device 115 with the channel. The recognition application 120 is described below in more detail with reference to FIG. 2.

The mobile device 115a, 115n is a computing device with limited display space that includes a memory, a processor and a camera. For example, the mobile device 115 can be a laptop computer, a tablet computer, a personal digital assistant (PDA), a mobile telephone, a smartphone, a mobile email device, etc. In some embodiments, the camera is a high resolution camera. The mobile device 115a, 115n is connected to the network 105, for example, 115a is connected to the network 105 via signal line 109.

The mobile device 115 is adapted to send and receive data to and from the recognition server 101. The mobile device 115a comprises an image capture application 130 and a browser 140. In one embodiment, the image capture application 130 receives instructions from a user accessing the mobile device 115a, captures an image from advertising content displayed on a display device 125 and transmits the image to the recognition server 101. The mobile device 115a receives a channel from the recognition application 120 and renders graphical information associated with the channel using the browser 140.

The display device 125 is an electronic device that displays visual data, for example, a television, a computer monitor or an electronic whiteboard. For example, when watching a news program displayed on a television, a user sees an advertisement of a drink in the middle of the news program and selects a "camera" button on a smartphone. In response to the selection of the "camera" button, the image capture application 130 embedded in the smartphone takes a picture of the advertised drink being displayed on the television. The image capture application 130 sends the picture of the drink to the recognition server 101. The recognition server 101 then identifies feature points from the image, matches the identified feature points with the feature points stored in a database and provides the mobile device 115 with a channel related to the matched feature points. The mobile device 115 includes a display for viewing the channel by a user.

Recognition Application

Figure 2:
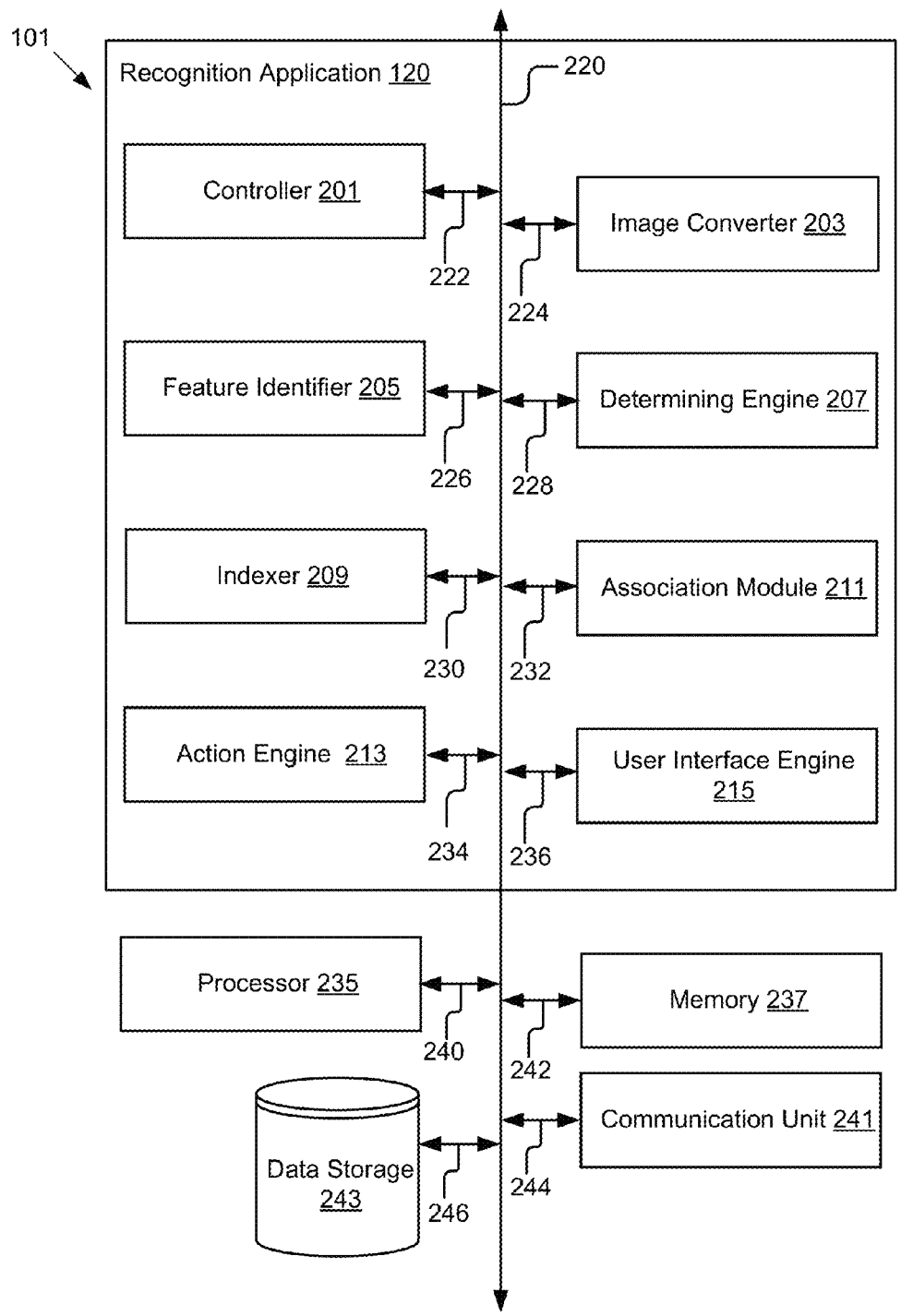
FIG. 2 is a block diagram illustrating one embodiment of a recognition application.

Referring now to FIG. 2, an example of the recognition application 120 is shown in more detail. FIG. 2 is a block diagram of a recognition server 101 that includes a recognition application 120, a processor 235, a memory 237, a communication unit 241 and data storage 243 according to some examples. The components of the recognition server 101 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality.

The processor 235 includes an arithmetic logic unit, a microprocessor, a general purpose controller or some other processor array to perform computations and to optionally provide electronic display signals to a display device. The processor 235 is coupled to the bus 220 for communication with the other components via signal line 240. The processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that can be executed by the processor 235. The memory 237 is coupled to the bus 220 for communication with the other components via signal line 242. The instructions and/or data may include code for performing the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 is hardware for receiving and transmitting data by linking the processor 235 to the network 105 and other processing systems. The communication unit 241 receives data such as an image from the mobile device 115 or advertising content from the advertisement server 107, and transmits the data to the controller 201. The communication unit 241 also transmits data including channel information to the mobile device 115 for display. The communication unit 241 is coupled to the bus 220 via signal line 244. In one embodiment, the communication unit 241 includes a port for direct physical connection to the mobile device 115 or to another communication channel. For example, the communication unit 241 includes an RJ45 port or similar port for wired communication with the mobile device 115. In another embodiment, the communication unit 241 includes a wireless transceiver (not shown) for exchanging data with the mobile device 115 or any other communication channel using one or more wireless communication methods, such as IEEE 802.11, IEEE 802.16, Bluetooth® or another suitable wireless communication method.

In yet another embodiment, the communication unit 241 includes a cellular communications transceiver for sending and receiving data over a cellular communications network such as via short messaging service (SMS), multimedia messaging service (MMS), hypertext transfer protocol (HTTP), direct data connection, wireless application protocol (WAP), e-mail or another suitable type of electronic communication. In still another embodiment, the communication unit 241 includes a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In some embodiments, the data storage 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. In the illustrated embodiment, the data storage 243 is communicatively coupled to the bus 220 via signal line 246.

In one embodiment, the data storage 243 includes a database. In one embodiment, the database stores one or more images of advertising content that are identified as unique and feature points associated with the one or more unique images. In another embodiment, the database also stores indices of the feature points for faster retrieval. In yet another embodiment, the database further stores one or more channels associated with the one or more unique images.

In one embodiment, the recognition application 120 comprises a controller 201, an image converter 203, a feature identifier 205, a determining engine 207, an indexer 209, an association module 211, an action engine 213 and a user interface engine 215. The components of the recognition application 120 are communicatively coupled via the bus 220.

The controller 201 can be software including routines for handling communications between the recognition application 120 and other components of the recognition server 101.

In one embodiment, the controller 201 can be a set of instructions executable by the processor 235 to provide the functionality described below for handling communications between the recognition application 120 and other components of the recognition server 101. In another embodiment, the controller 201 can be stored in the memory 237 of the recognition server 101 and can be accessible and executable by the processor 235. In either embodiment, the controller 201 can be adapted for cooperation and communication with the processor 235 and other components of the recognition server 101 via signal line 222.

In one embodiment, the controller 201 sends and receives data, via the communication unit 241, to and from one or more of a mobile device 115 and an advertisement server 107. For example, the controller 201 receives, via the communication unit 241, advertising content from the advertisement server 107 and sends the advertising content to the image converter 203. In another example, the controller 201 receives graphical data for providing a user interface to a user from the user interface module 215 and sends the graphical data to the mobile device 115, causing the browser 140 on the mobile device 115 to render the user interface.

In one embodiment, the controller 201 receives data from other components of the recognition application 120 and stores the data in the data storage 243. For example, the controller 201 receives data including image feature points from the feature identifier 205 and stores the data in a database included in the data storage 243. In another embodiment, the controller 201 retrieves data from the data storage 243 and sends the data to other components of the recognition application 120. For example, the controller 201 retrieves data including indexed images from the data storage 243 and sends the retrieved data to the action engine 213.

The image converter 203 can be software including routines for receiving advertising content and identifying images within the advertising content. In one embodiment, the image converter 203 can be a set of instructions executable by the processor 235 to provide the functionality described below for identifying images within advertising content. In another embodiment, the image converter 203 can be stored in the memory 237 of the recognition server 101 and can be accessible and executable by the processor 235. In either embodiment, the image converter 203 can be adapted for cooperation and communication with the processor 235, the feature identifier 205 and other components of the recognition server 101 via signal line 224.

In one embodiment, the image converter 203 receives advertising content from the advertisement server 107 via the controller 201. The advertising content is an advertisement that comprises a series of frames. The advertising content is displayed in moving frames on a display device 125. In another embodiment, the image converter 203 receives video content from the advertisement server 107 and a video server (not shown). The video content is all content relating to the video display. The video content includes advertising content in different ways. In one embodiment, the advertising content is an advertisement between the video content, for example, an advertisement between a first TV show and a second TV show or a sportswear advertisement in a commercial break of a football game. In another embodiment, the advertising content is an advertisement within the video content, for example, a product placement in a movie or a news segment that links to an online calendar of community events.

The image converter 203 identifies each frame within the advertising content based on a frame rate. The frame rate is the number of still pictures per unit time when displaying the advertising content. Typical frame rates for advertising content include 25 frames per second, 29.97 frames per second or even up to 90 frames per second. In some embodiments, the image converter 203 uses a brute force technique to identify each of 250 frames for a 10-second advertising content with a frame rate 25 frames per second and creates a collection of 250 frames for the advertising content. The image converter 203 also identifies the images corresponding to the frames within the advertising content. In one embodiment, the image converter 203 identifies each frame of the advertising content as an image. For the above example, the image converter treats each of 250 frames as an image of the advertising content. In the case where the image converter 203 receives the video content rather than merely the advertising content, the image converter 203 identifies images within the entire video content. The image converter 203 transmits the images to the feature identifier 205 or stores the images in a database included in the data storage 243.

The feature identifier 205 can be software including routines for determining feature points in the received images. In one embodiment, the feature identifier 205 can be a set of instructions executable by the processor 235 to provide the functionality described below for determining feature points in the received images. In another embodiment, the feature identifier 205 can be stored in the memory 237 of the recognition server 101 and can be accessible and executable by the processor 235. In either embodiment, the feature identifier 205 can be adapted for cooperation and communication with the processor 235, the image converter 203, the determining engine 207, the user interface engine 215 and other components of the recognition server 101 via signal line 226.

In one embodiment, the feature identifier 205 receives images of advertising content and identifies feature points for each image in the advertising content. The feature identifier 205 receives the images corresponding to frames within advertising content from the image converter 203, extracts a set of feature points from each of the images, and transmits the feature points and the images to the determining engine 207. The feature points include different types of information characterizing an image such as information about color, texture or edges of the image. In one embodiment, the feature points also include a location in the image where each feature point occurs. The feature identifier 205 extracts feature points that are robust to variations in scale, ambient lighting, image acquisition parameters, etc. For example, the feature identifier 205 can take the original images and resize them, save versions with shading, correct for blur and tilt, etc.

In another embodiment, the feature identifier 205 receives images of video content and identifies feature points for each image of advertising content including separating the advertising content from the video content. The feature identifier 205 receives images of video content from the image converter 203, extracts a set of feature points from each of the images, determines, based at least in part on the feature points, a portion of images that correspond to frames of the advertising content included in the video content, identifies a subset of feature points for the portion of images, and transmits the subset of feature points and the portion of images of the advertising content to the determining engine 207. In one example, the feature identifier 205 receives 500 images from the image converter 203 that correspond to 500 frames of a shoe advertisement and a news program. The feature identifier 205 determines that the first 200 images in the 500 images is an advertisement and transmits the first 200 images and feature points associated with the first 200 images to the determining engine 207. In another example, the feature identifier 205 determines that 100 images among 400 images of a TV show include an embedded food advertisement (e.g., a product placement) with the 100 images, and transmits the 100 images and feature points for the embedded food advertisement to the determining engine 207.

In one embodiment, the feature identifier 205 identifies feature points from images of video content, applies contextual analysis on the images and feature points, and determines images of advertising content from the images of video content. For example, the feature identifier 205 identifies a set of feature points for each image of video content and analyzes the context of the images and the set of feature points. Based on the contextual analysis, the feature identifier 205 determines that the video content is a conversation about local real estate, and identifies that subsets of feature points are related to a brand of soft drink and are therefore irrelevant to the subject of the conversation. If the number of images from which the subsets of feature points are identified exceeds a threshold number, the feature identifier 205 determines that the images are associated with an advertisement of the brand of soft drink. In another embodiment, the feature identifier 205 also analyzes feature points associated with each image of video content to determine a start or an end of advertising content based on a significant change of the feature points. For example, the feature identifier 205 determines that feature points associated with the first 20 images of video content include at least one of a boy's face and a bike and that the feature points associated with the images starting from the $21^{st}$ image no longer include the boy's face or the bike. As a result, the feature identifier 205 determines that only the first 20 images include advertising content for the bike. Those skilled in the art will recognize that there are other approaches that can be used to separate advertising content from video content.

In yet another embodiment, the feature identifier 205 receives an image from a mobile device 115 via the controller 201, extracts a set of feature points from the image and transmits the feature points and the image to the determining engine 207 for further processing. In one embodiment, the image is captured from advertising content displayed on a display device 125 by a user using the mobile device 115. The feature identifier 205 identifies the same feature points for images having different orientations in the same plane. For example, a user takes two pictures of a piano displayed on the television by positioning a cell phone in front of the television in two different angles. The feature identifier 205 receives the two pictures from the user and identifies the same feature points for the same piano irrespective of different object angles in the image plane. This is helpful in correcting for a shaky hand or a capture that is not perfectly parallel with the display.

In one embodiment, the feature identifier 205 sends the images and feature points associated with the images to the determining engine 207. In another embodiment, the feature identifier 205 stores the images and feature points associated with the images in a database included in the data storage 243.

The determining engine 207 can be software including routines for determining whether a first set of feature points identified from an image matches a second set of feature points stored in a database. In one embodiment, the determining engine 207 can be a set of instructions executable by the processor 235 to provide the functionality described below for determining whether the first and second sets of feature points match. In another embodiment, the determining engine 207 can be stored in the memory 237 of the recognition server 101 and can be accessible and executable by the processor 235. In either embodiment, the determining engine 207 can be adapted for cooperation and communication with the processor 235, the feature identifier 205, the indexer 209, the association engine 211, the action engine 213 and other components of the recognition server 101 via signal line 228.

In one embodiment, the feature identifier 205 extracts a first set of feature points from an image of advertising content provided by the advertisement server 107 and transmits the first set of feature points and the image to the determining engine 207. The determining engine 207 compares the first set of feature points to a second set of feature points stored in a database included in the data storage 243, and determines whether the first and second sets of feature points match. For example, the feature points for a first image and a second image that correspond to two adjacent frames in advertising content could share a lot of similarities. The determining engine 207 may determine that a first set of feature points from the first image matches a second set of feature points if the second set of feature points is identified from the second image and is stored in the database. In one embodiment, the determining engine 207 determines that the first and second sets of feature points match if they are within a predefined threshold. For example, if 85% of feature points in the first and second sets of feature points match each other, and the threshold is 80%, the determining engine 207 determines that the first and second sets of feature points match.

In response to determining that the first set of feature points from the image of advertising content does not match the second set of feature points stored in the database (e.g., a recognition failure), the determining engine 207 identifies the image as being unique. In response to determining that the first set of feature points from the image of advertising content matches the second set of feature points stored in the database (e.g., a recognition success), the determining engine 207 determines whether there is another image available for processing. The processes of identifying feature points from an image and matching the feature points of the image to a database are iterated until the determining engine 207 determines that every image within the advertising content is processed. Once every image within the advertising content has been processed, the determining engine 207 identifies all unique images for the advertising content and creates a set that includes all the unique images to identify and classify the advertising content. The determining engine 207 transmits the set of unique images and feature points associated with each unique image in the set to the indexer 209 for indexing and to the association module 211 for associating with a channel.

Since the determining engine 207 groups images that share matching feature points to a single unique image (e.g., in the cases of recognition success), the determining engine 207 determines a minimum set of unique images. For example, out of 400 images of advertising content, the determining engine 207 determines that the feature points extracted from 200 of the images are unique. As a result, only half of the images are indexed and the processing time for matching a captured image with the indexed image is reduced.

In another embodiment, the feature identifier 205 extracts a first set of feature points from an image captured by a mobile device 115 and transmits the first set of feature points and the captured image to the determining engine 207. The image is captured from advertising content displayed on a device display 125. The determining engine 207 determines whether the first set of feature points matches a second set of feature points stored in a database. In response to a match between the first and second sets of feature points, the determining engine 207 transmits data describing the mobile device, the captured image and the first and second sets of feature points to the action engine 213 to notify the action engine 213 to provide a channel to the mobile device.

The indexer 209 can be software including routines for indexing a unique image of advertising content in a database. In one embodiment, the indexer 209 can be a set of instructions executable by the processor 235 to provide the functionality described below for indexing a unique image of advertising content. In another embodiment, the indexer 209 can be stored in the memory 237 of the recognition server 101 and can be accessible and executable by the processor 235. In either embodiment, the indexer 209 can be adapted for cooperation and communication with the processor 235, the determining engine 207, the action engine 213 and other components of the recognition server 101 via signal line 230.

In one embodiment, the indexer 209 receives a unique image of advertising content from the determining engine 207 and indexes the unique image in a database. For example, the indexer 209 maps the unique image to a value (e.g., a number, an alphabetical letter, etc.) in a file format (e.g., Extensible Markup Language (XML) format). The indexer 209 also indexes a set of feature points identified from the unique image and a location in the unique image where each feature point occurs. The indexer 209 indexes each image in the set of unique images for the advertising content. For example, the indexer 209 may index five images for a 10-second advertising content and index 30 images for another 10-second advertising content. In one embodiment, the indexer 209 stores index information as metadata of the image.

In another embodiment, the indexer 209 also identifies and retrieves an index from the database. For example, the indexer 209 identifies an index for a set of feature points from the database and communicates with the association module 211 to retrieve a channel associated with the set of feature points based on the index. The indexer 209 organizes the indices to support a feature-based query or other fast retrievals.

The association module 211 can be software including routines for associating a unique image with one or more channels. In one embodiment, the association module 211 can be a set of instructions executable by the processor 235 to provide the functionality described below for associating a unique image with one or more channels. In another embodiment, the association module 211 can be stored in the memory 237 of the recognition server 101 and can be accessible and executable by the processor 235. In either embodiment, the association module 211 can be adapted for cooperation and communication with the processor 235, the determining engine 207, the action engine 213 and other components of the recognition server 101 via signal line 232.

The association module 211 receives a unique image determined for advertising content from the determining engine 207 and associates the unique image with one or more channels. For example, the image could be of a telephone number or a website displayed as part of the advertising content. The channel can be received from the advertisement server 107 and includes information about the advertiser. For example, the channel could include the telephone number for the company being advertised, the a website being advertised, an order form for ordering a product associated with the company, a coupon for a good or service associated with the company, etc. In some embodiments, the advertiser can select which channel(s) should be associated with the image even though a phone number, for example, is displayed with the particular image. In one embodiment, the association module 211 associates different unique images of advertising content with different channels. For example, the association module 211 receives three unique images from the determining engine 207. The first, second and third unique images are from the beginning, middle and end of a restaurant advertisement, respectively. The association module 211 associates the first image with a link to the restaurant's website, associates the second image with a menu, and associates the third image with a coupon for purchasing dinner.

The association module 211 stores the one or more channels associated with a unique image to the database that stores the index of the unique image. The association module 211 communicates with the indexer 209 to retrieve the unique image, the feature points identified from the unique image and the one or more channels associated with the unique image from the database based on the index. In one embodiment, the association module 211 also adds the channel information to the image as metadata of the image.

The action engine 213 can be software including routines for providing one or more channels to a user. In one embodiment, the action engine 213 can be a set of instructions executable by the processor 235 to provide the functionality described below for providing one or more channels to a user. In another embodiment, the action engine 213 can be stored in the memory 237 of the recognition server 101 and can be accessible and executable by the processor 235. In either embodiment, the action engine 213 can be adapted for cooperation and communication with the processor 235, the determining engine 207, the indexer 209, the association module 211, the user interface engine 215 and other components of the recognition server 101 via signal line 234.

The action engine 213 provides one or more channels related to advertising content to a user who is interested in the advertising content. For example, the user is watching an advertisement on television and wants to know more about a vacuum displayed on the television. The user takes a picture of the vacuum with a smartphone. The feature identifier 205 receives the image of the vacuum, extracts a first set of feature points from the image, and transmits the first set of feature points and the image to the determining engine 207. The determining engine 207 determines a successful recognition by matching the first set of feature points to a second set of feature points stored in a database. For example, the determining engine 207 determines that the feature points from an image including the vacuum vertically match the feature points from an image including the vacuum horizontally. Responsive to the successful recognition, the determining engine 207 notifies the action engine 213 to provide a channel to the user. The channel includes information about the vacuum. As a result, a user can view the advertisement and can connect to the advertised product while watching the advertisement rather than having to remember to search for the product information later.

Once a successful recognition of a first image captured by a user using a mobile device is determined, the determining engine 207 transmits to the action engine 213 data describing the mobile device, the first image, a first set of feature points identified from the first image (optional), and a second set of feature points matching the first set of feature points. In response to receiving the data, the action engine 213 communicates with the indexer 209 and the association module 211 to retrieve a second image associated with the second set of feature points and to identify one or more channels associated with the second image from the database based on an index of the second set of feature points. The action engine 213 then communicates with the user interface engine 215 to present channel information on a display of the mobile device.

In one embodiment, the action engine 213 provides channel information for viewing by the user. For example, the action engine 213 provides manufacture specifications of an advertised car responsive to a user snapping a picture of the car advertisement. In another example, two or more channels include channel information in a list. In another embodiment, the action engine 213 also receives user input regarding the channel information, performs an action based on the user input and provides an action result to the user. In one example, responsive to a matched image of an advertised pizza, the action engine 213 communicates with the user interface engine 215 to receive a user selection of an "order" option shown on a user interface displayed on a user's tablet screen and to order the advertised pizza for a user that is going to have dinner. Once the order is processed (e.g., by a server not shown), the action engine 213 notifies the user by providing a message on the tablet screen. In another example, in addition to providing a telephone number of the advertiser on a user interface displayed on a smartphone, the action engine 213 also generates code for instructing the mobile device 115 to call the number once a user clicks a "make a call" button on the user interface. The process of identifying an image of advertising content and providing a channel associated with the image to a user is depicted below in more detail with reference to FIGS. 5A and 5B.

The user interface engine 215 is software including routines for generating graphical data for providing user interfaces to users. In one embodiment, the user interface engine 215 is a set of instructions executable by the processor 235 to provide the functionality below for generating graphical data for providing the user interfaces. In another embodiment, the user interface engine 215 is stored in the memory 237 and is accessible and executable by the processor 235. In either embodiment, the user interface engine 215 is adapted for cooperation and communication with the processor 235 and other components of the recognition server 101 via signal line 238.

In one embodiment, the user interface engine 215 generates a graphical interface for a user of a mobile device 115 to capture an image of the advertising content displayed on a display device 125. In another embodiment, the user interface engine 215 receives instructions from the action engine 213 to generate graphical data for presenting channel information on a mobile device 115 for a user. In yet another embodiment, in response to user input regarding the channel information, the user interface engine 215 generates a graphical image for displaying a result of an action performed based on the user input. The user interface module 215 sends the graphical data to an application (e.g., a browser) in the mobile device 115 via the communication unit 241 causing the application to display the data in a user interface.

Example Methods and Graphic Representations

Figure 3:
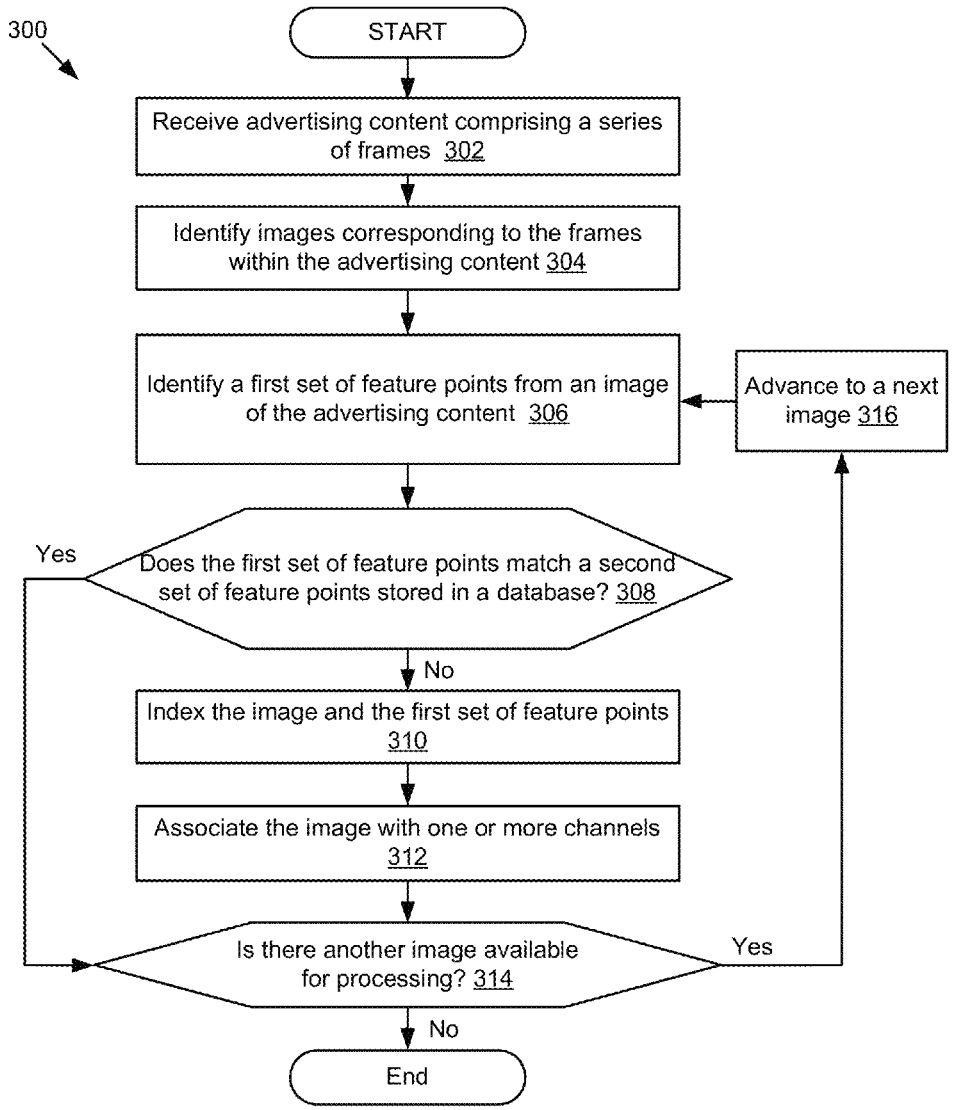
FIG. 3 is a flow diagram illustrating one embodiment of a method for associating a channel with advertising content based on identifying and indexing the advertising content.

FIG. 3 is a flow diagram 300 of one embodiment of a method for associating a channel with advertising content based on identifying and indexing the advertising content. The recognition application 120 includes a controller 201, an image converter 203, a feature identifier 205, a determining engine 207, an indexer 209 and an association module 211.

The image converter 203 receives 302 advertising content comprising a series of frames via the controller 201. In one embodiment, the advertising content is an advertisement displayed between video content. The video content is all content relating to a video display device 125. For example, the advertising content is an advertisement displayed between a first TV show and a second TV show or a sportswear advertisement in a commercial break of a football game. In another embodiment, the advertising content is an advertisement within the video content, for example, a product placement in a movie or a news segment that links to an online calendar of community events. The image converter 203 identifies 304 images within the advertising content. In one embodiment, the image converter 203 identifies each frame within the advertising content based on a frame rate and determines each frame as an image. For example, the image converter 203 uses a brute force technique to identify each of 250 frames for a 10-second advertising content with a frame rate 25 frames per second and determines each of 250 frames as an image of the advertising content.

The feature identifier 205 identifies 306 a first set of feature points from an image. The feature points include different types of information characterizing an image such as information about color, texture, edges, etc. and a location in the image where each feature point occurs. The feature identifier 205 extracts feature points. The feature identifier 205 transmits the first set of feature points and the image to the determining engine 207.

The determining engine 207 determines 308 whether the first set of feature points match a second set of feature points stored in a database. For example, where the first set of feature points correspond to an image of a person talking and the second set of feature points correspond to an image of a person talking later in the same video, the two images share a lot of similarities and the determining engine 207 determines that the two sets of feature points respectively identified from the two images match each other. In one embodiment, the determining engine 207 determines that the first and second sets of feature points match if they are within a predefined threshold.

In response to the first set of feature points failing to match the second set of feature points (e.g., a recognition failure), the indexer 209 determines that the image is unique and indexes 310 the image and the first set of feature points. The second set of feature points can be, for example, a first image from the advertising content, which will generally be determined to be unique since the index would lack feature points to compare it to. For example, the indexer 209 maps the unique image to a value (e.g., a number, an alphabetical letter, etc.) in a file format (e.g., Extensible Markup Language (XML) format). In one embodiment, the indexer 209 also indexes a location in the unique image where each feature point occurs.

The association module 211 associates 312 the image with one or more channels. For example, the image could include a phone number or a website. The channel includes information about the advertiser. For example, the channel could be the telephone number for the company being advertised, the website for the company being advertised, an order form for ordering a product associated with the company, a coupon for a good or service associated with the company, etc. In some embodiments, the advertiser can select which channel(s) should be associated with the image even though a phone number, for example, is displayed with the particular image. In one embodiment, the association module 211 associates different unique images of advertising content with different channels.

At step 314, the determining engine 207 determines whether there is another image available for processing. If there is another image available for processing, the method 300 advances 316 to a next image. If a last image of the advertising content has been processed, the method 300 completes.

Figure 4:
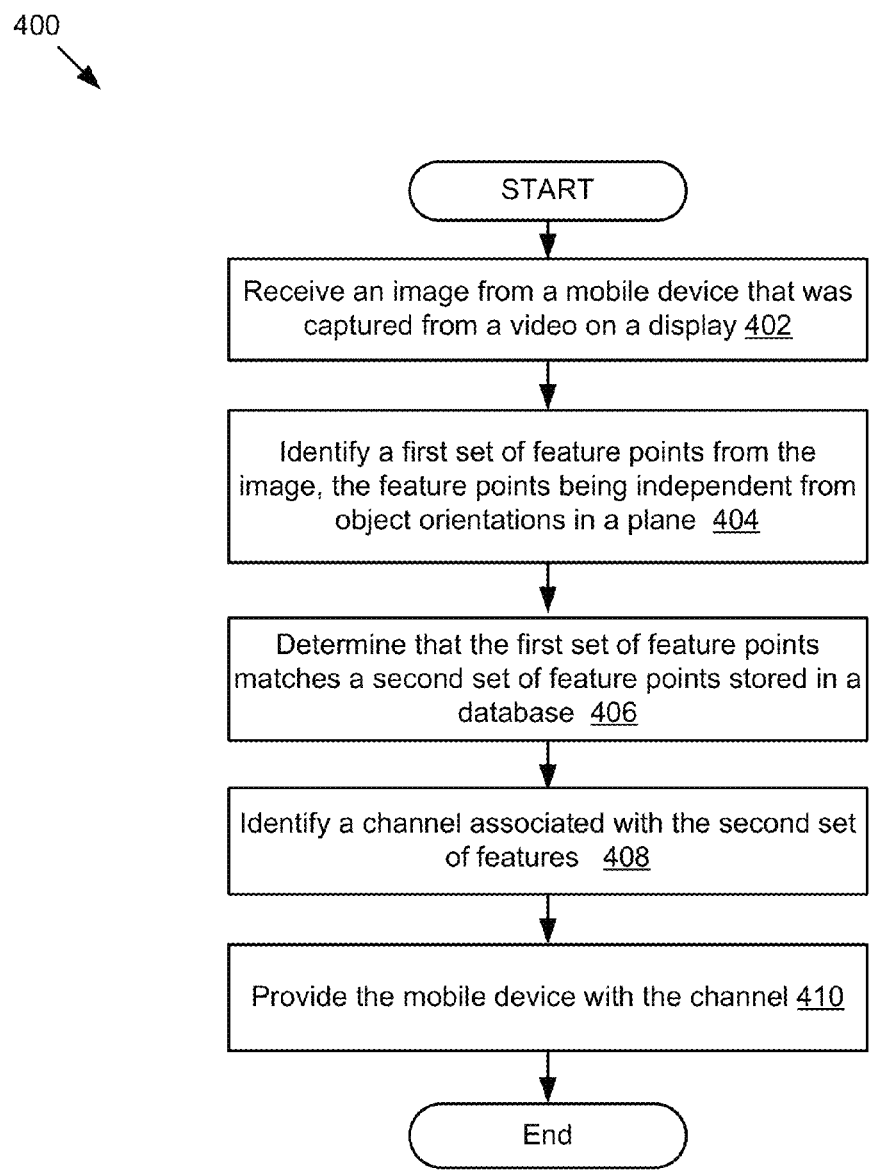
FIG. 4 is a flow diagram illustrating one embodiment of a method for providing a channel related to advertising content based on identifying the advertising content.

FIG. 4 is a flow diagram 400 of one embodiment of a method for providing a channel related to advertising content based on identifying the advertising content. The recognition application 120 includes a controller 201, a feature identifier 205, a determining engine 207, an indexer 209 and an action engine 213.

The controller 201 receives 402 an image from a mobile device 115 that was captured from a video on a display device 125. For example, the user takes a picture of an advertised product with a smartphone when watching an advertisement on television. The feature identifier 205 identifies 404 a first set of feature points from the image, the feature points being independent from object orientations in a plane. For example, the feature identifier 205 identifies the same feature points from an image that was taken of the television at an angle and an image from the advertising content. The determining engine 207 determines 406 that the first set of feature points matches a second set of feature points stored in a database. The indexer 209 identifies 408 one or more channels associated with the second set of feature points.

The action engine 213 provides 410 the mobile device 115 with the one or more channel. In one example, the action engine 213 provides manufacture specifications of an advertised car responsive to a user snapping a picture of the car advertisement. In another example, responsive to a matched image of an advertised pizza, the action engine 213 communicates with the user interface engine 215 to receive a user selection of an "order" option shown on a user interface displayed on a user's tablet screen and to order the advertised pizza for a user that is going to have dinner. Once the order is processed (e.g., by a server not shown), the action engine 213 notifies the user by providing a message on the tablet screen.

Figure 5A:
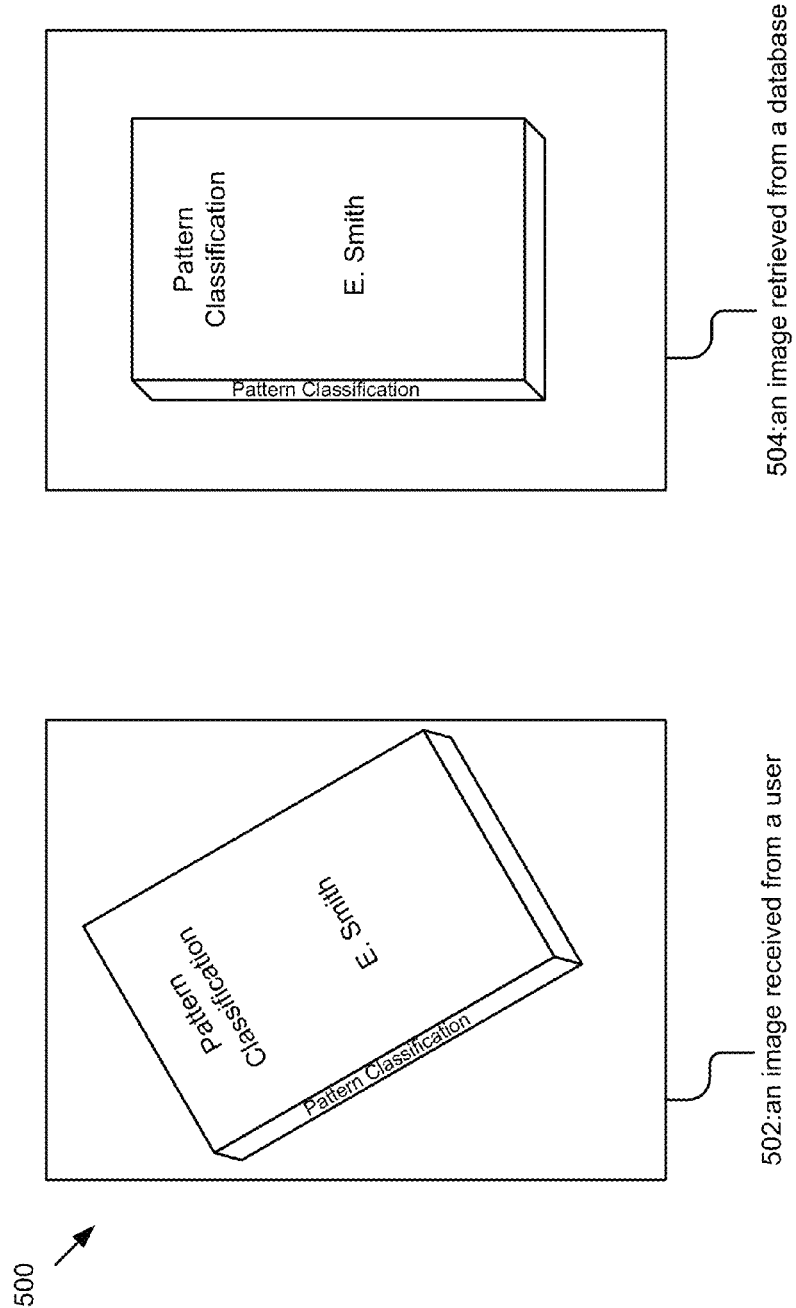
FIG. 5A is a graphical representation of example images in identifying advertising content.
Figure 5B:
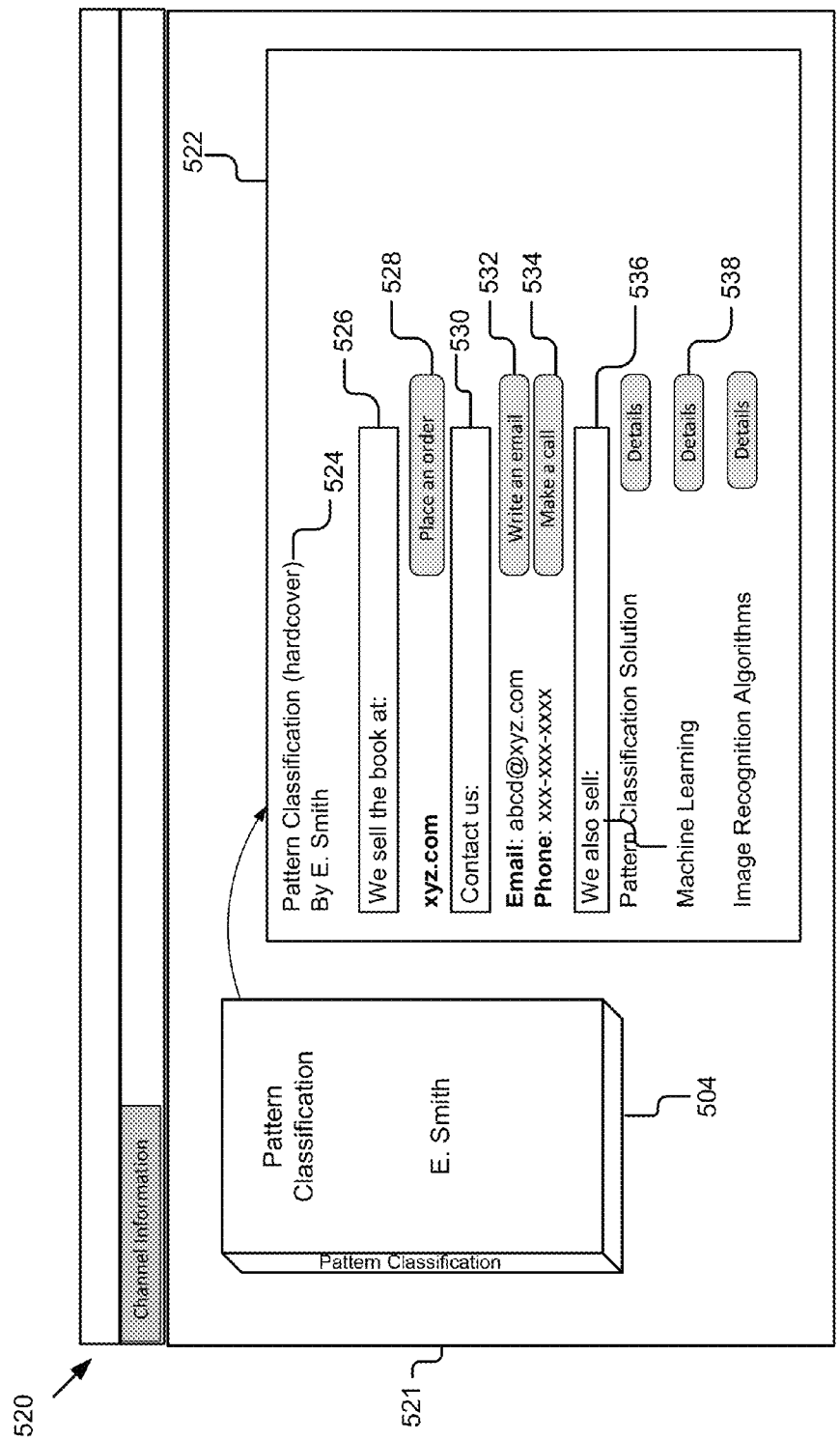
FIG. 5B is a graphical representation of an example channel provided based on the advertising content identified in FIG. 5A.

FIGS. 5A and 5B are graphic representations 500 and 520, respectively, illustrating a process of identifying an image of advertising content and providing a channel associated with the image to a user. Referring to FIG. 5A, the graphic representation 500 includes images 502 and 504. The image 502 is a picture of a book "pattern classification" taken from a television advertisement by a user using a smartphone when watching television. The feature identifier 205 receives the image 502 from the user and identifies a first set of feature points from the image 502. The determining engine 207 determines that the first set of feature points matches a second set of feature points stored in a database. The second set of feature points is associated with the image 504. The images 502 and 504 include the same book positioned in different angles. The action engine 213 communicates with the indexer 209 to retrieve the image 504 from the database.

Referring now to FIG. 5B, the graphic representation 520 includes a user interface 521 generated by the user interface engine 215 responsive to receiving instructions from the action engine 213. The user interface 521 includes channel information 522 associated with the image 504 shown in FIG. 5A. The channel information 522 includes book information 524 (e.g., a hardcover book), seller information 526, contact information of the seller 530 (e.g., an email address and a phone number) and information of related books 536. The channel information 522 also includes an option 528 for the user to place an order of the book, an option 532 for the user to write an email to the seller of the book, an option 534 for the user to make a call to the seller and options 538 for the user to link to detailed information of related books. In one embodiment, the action engine 213 also instructs the user interface engine 215 to generate another user interface (not shown) to display messages resulting from a user selecting options 528, 532, 534 and 538. For example, responsive to the user selecting the option 538, the action engine 213 instructs the user interface engine 215 to display the author, the publisher, the seller, the abstract and other information about the book "machine learning" on the user's smartphone.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
    receiving, with one or more processors, video content comprising a series of frames;
    identifying a first image corresponding to a first frame within the video content;
    identifying, with the one or more processors, a first set of feature points from the first image;
    creating one or more entries in an indexed database including a minimum image set of the video content by:
        storing the first image and the first set of feature points in the indexed database; and
        for each frame of the series of frames after the first frame,
            identifying a corresponding image for the frame;
            identifying a set of feature points from the corresponding image;
            determining, with the one or more processors, whether the set of feature points from the corresponding image matches feature points stored in the indexed database; and
            in response to determining that the set of feature points from the corresponding image fails to match the feature points stored in the indexed database, identifying the corresponding image as a unique image and storing the corresponding image and the set of feature points from the corresponding image in the indexed database; and
    associating the minimum image set of the video content with advertising information.

2. The method of claim 1, further comprising:
    receiving an image captured from the video content using a mobile device;
    identifying a set of feature points from the received image;
    determining that the set of feature points from the received image matches the feature points stored in the indexed database; and
    providing the mobile device with the advertising information.

3. The method of claim 1, wherein the advertising information includes information about an advertiser associated with the video content.

4. The method of claim 1, further comprising associating different images in the minimum image set of the video content with different advertising information.

5. The method of claim 1, wherein the video content includes an advertisement.

6. The method of claim 1, wherein identifying the first image and the corresponding image is based on a frame rate of the video content.

7. The method of claim 1, further comprising:
    receiving user input regarding the advertising information; and
    performing an action responsive to receiving the user input.

8. The method of claim 1, wherein determining whether the set of feature points from the corresponding image matches the feature points stored in the indexed database further comprises determining whether a percentage of the set of feature points from the corresponding image that matches the feature points stored in the indexed database is within a predefined threshold.

9. A system comprising:
    one or more processors;
    an image converter stored on a memory and executable by the one or more processors, the image converter configured to receive video content comprising a series of frames and identify a first image corresponding to a first frame within the video content;
    a feature identifier coupled to the image converter and configured to identify a first set of feature points from the first image;
    a determining engine coupled to the feature identifier and configured to create one or more entries in an indexed database including a minimum image set of the video content by:
        transmitting, to an indexer, the first image and the first set of feature points to store in the indexed database; and
        for each frame of the series of frames after the first frame,
            receiving, from the image converter, a corresponding image for the frame;
            receiving, from the feature identifier, a set of feature points from the corresponding image;
            determining whether the set of feature points from the corresponding image matches feature points stored in the indexed database; and
            in response to determining that the set of feature points from the corresponding image fails to match the feature points stored in the indexed database, identifying the corresponding image as a unique image and transmitting, to the indexer, the corresponding image and the set of feature points from the corresponding image in to store in the indexed database; and
    an association module coupled to the determining engine and configured to associate the minimum image set of the video content with advertising information.

10. The system of claim 9, wherein the feature identifier is further configured to receive an image captured from the video content using a mobile device and identify a set of feature points from the received image, the determining engine is further configured to determine that the set of feature points from the received image matches the feature points stored in the indexed database, and the system further comprises an action engine coupled to the determining engine and configured to provide the mobile device with the advertising information.

11. The system of claim 9, wherein the advertising information includes information about an advertiser associated with the video content.

12. The system of claim 9, wherein the association module is further configured to associate different images in the minimum image set of the video content with different advertising information.

13. The system of claim 9, further comprising an action engine coupled to the determining engine and configured to:
   receive user input regarding the advertising information; and
   perform an action responsive to receiving the user input.

14. The system of claim 9, wherein determining whether the set of feature points from the corresponding image matches the feature points stored in the indexed database further comprises determining whether a percentage of the set of feature points from the corresponding image that matches the feature points stored in the indexed database is within a predefined threshold.

15. A computer program product comprising a non-transitory computer useable medium including a computer readable program, wherein the computer readable program when executed on a computer causes the computer to:
   receive video content comprising a series of frames;
   identify a first image corresponding to a first frame within the video content;
   identify a first set of feature points from the first image;
   create one or more entries in an indexed database including a minimum image set of the video content by:
      storing the first image and the first set of feature points in the indexed database; and
      for each frame of the series of frames after the first frame,
         identifying a corresponding image for the frame;
         identifying a set of feature points from the corresponding image;
         determining whether the set of feature points from the corresponding image matches feature points stored in the indexed database; and
         in response to determining that the set of feature points from the corresponding image fails to match the feature points stored in the indexed database, identifying the corresponding image as a unique image and storing the corresponding image and the set of feature points from the corresponding image in the indexed database; and
   associate the minimum image set of the video content with advertising information.

16. The computer program product of claim 15, wherein the computer readable program when executed on the computer further causes the computer to:
   receive an image captured from the video content using a mobile device;
   identify a set of feature points from the received image;
   determine that the set of feature points from the received image matches the feature points stored in the indexed database; and
   provide the mobile device with the advertising information.

17. The computer program product of claim 15, wherein the advertising information includes information about an advertiser associated with the video content.

18. The computer program product of claim 15, wherein the computer readable program when executed on the computer further causes the computer to associate different images in the minimum image set of the video content with different advertising information.

19. The computer program product of claim 15, wherein the computer readable program when executed on the computer further causes the computer to:
   receive user input regarding the advertising information; and
   perform an action responsive to receiving the user input.

20. The computer program product of claim 15, wherein determining whether the set of feature points from the corresponding image matches the feature points stored in the indexed database further comprises determining whether a percentage of the set of feature points from the corresponding image that matches the feature points stored in the indexed database is within a predefined threshold.

* * * * *